US011570498B2

(12) United States Patent
Lewis et al.

(10) Patent No.: US 11,570,498 B2
(45) **Date of Patent: *Jan. 31, 2023**

(54) USING MACHINE LEARNING AND OTHER MODELS TO DETERMINE A USER PREFERENCE TO CANCEL A STREAM OR DOWNLOAD

(71) Applicant: Google LLC, Mountain View, CA (US)

(72) Inventors: Justin Lewis, Marian Del Rey, CA (US); Thomas Price, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/465,543

(22) Filed: Sep. 2, 2021

(65) Prior Publication Data

US 2021/0400324 A1 Dec. 23, 2021

Related U.S. Application Data

(63) Continuation of application No. 15/815,321, filed on Nov. 16, 2017, now Pat. No. 11,115,695.

(51) Int. Cl.

| | |
|---|---|
| ***H04N 21/25*** | (2011.01) |
| ***H04N 21/258*** | (2011.01) |
| ***H04L 41/16*** | (2022.01) |
| ***H04L 67/10*** | (2022.01) |
| *H04L 43/0817* | (2022.01) |

(52) U.S. Cl.

CPC ........... *H04N 21/252* (2013.01); *H04L 41/16* (2013.01); *H04L 67/10* (2013.01); *H04N 21/25841* (2013.01); *H04N 21/25858* (2013.01); *H04N 21/25891* (2013.01); *H04L 43/0817* (2013.01)

(58) Field of Classification Search

None

See application file for complete search history.

(56) References Cited

U.S. PATENT DOCUMENTS

| | | | |
|---|---|---|---|
| 7,027,415 | B1 | 4/2006 | Dahlby et al. |
| 2007/0197246 | A1 | 8/2007 | Julian |
| 2010/0128687 | A1 | 5/2010 | Oteri et al. |
| 2015/0281094 | A1 | 10/2015 | Kase et al. |
| 2017/0024548 | A1 | 1/2017 | Dorwin et al. |
| 2017/0064754 | A1 | 3/2017 | Choi |

FOREIGN PATENT DOCUMENTS

| | | | |
|---|---|---|---|
| EP | 2574010 | A2 | 3/2013 |
| WO | 2016048719 | A1 | 3/2016 |

OTHER PUBLICATIONS

Matt Klein How to Control Your Chromecast Video Streams for Muliple Devices: Dec. 10, 2014 https://www.nottogeek.com/204852/how-to-control-your-chormcast-video-streams-from-multple-devices/.

International Search Report and Written Opinion dated Nov. 12, 2018, on application No. PCT/2018/046768.

*Primary Examiner* — William J Kim

(74) *Attorney, Agent, or Firm* — Lowenstein Sandler LLP

(57) ABSTRACT

A system and method are disclosed for training a machine learning model using information pertaining to transmissions of one or more media items to user devices associated with a user account. Generating training data for the machine learning model includes generating first contextual information associated with a first user device and generating a first target output that identifies an indication of a preference of a user preference to cancel the first transmission. The method includes providing the training data to train the machine learning model.

25 Claims, 5 Drawing Sheets

100

SERVER MACHINE 130
TRAINING SET GENERATOR 131
SERVER MACHINE 140
TRAINING ENGINE 141
MODEL 160
SERVER MACHINE 150
TRANSMISSION CANCELATION ENGINE 151
CHANNEL A
MEDIA ITEM 121
MEDIA ITEM 121
PLAYLIST A
MEDIA ITEM 121
MEDIA ITEM 121
PLAYLIST Z
MEDIA ITEM 121
MEDIA ITEM 121
RECOMMENDATION ENGINE 122
TRANSMISSION CANCEL ENGINE 151
CONTENT SHARING PLATFORM 120
DATA STORE 106
NETWORK 104
MEDIA VIEWER 111
CLIENT 110A
MEDIA VIEWER 111
CLIENT 110Z

USING MACHINE LEARNING AND OTHER MODELS TO DETERMINE A USER PREFERENCE TO CANCEL A STREAM OR DOWNLOAD

RELATED APPLICATIONS

This application is a continuation of U.S. patent application Ser. No. 15/815,321, filed Nov. 16, 2017, the entire contents of which is hereby incorporated by reference herein.

TECHNICAL FIELD

Aspects and implementations of the disclosure relate to content sharing platforms, and more specifically, to predicting a user preference to cancel a stream or download of a media item.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for training a machine learning model using information pertaining to transmissions of one or more media items to user devices associated with a user account. In an implementation, training input data for the machine learning model includes first contextual information associated with a first user device and second contextual information associated with a second user device, wherein a number of the transmissions to the user devices for the user account exceeds a threshold number of transmissions allowed for the user account. Training output data identifies an indication of a preference of a user associated with the user account to cancel a first transmission to the first user device responsive to the number of the transmissions to the plurality of user devices exceeding the threshold number, and an indication of a preference of the user to keep a second transmission to the second user device responsive to the number of the transmissions exceeding the threshold number.

In some implementations, a system and method are disclosed where the trained machine learning model is used to determine which transmission from new transmissions of one or more media items to the plurality of user devices for the user account is to be canceled in response to the number of the new transmissions exceeding the threshold number of transmissions allowed for the user account. In some implementations, the trained machine learning model is configured to generate one or more outputs indicating (i) a first new transmission to the first device and a second new transmission to the second user device and (ii) a level of confidence for a preference of the user to cancel the first new transmission and a level of confidence for a preference of the use to cancel the second new transmission.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
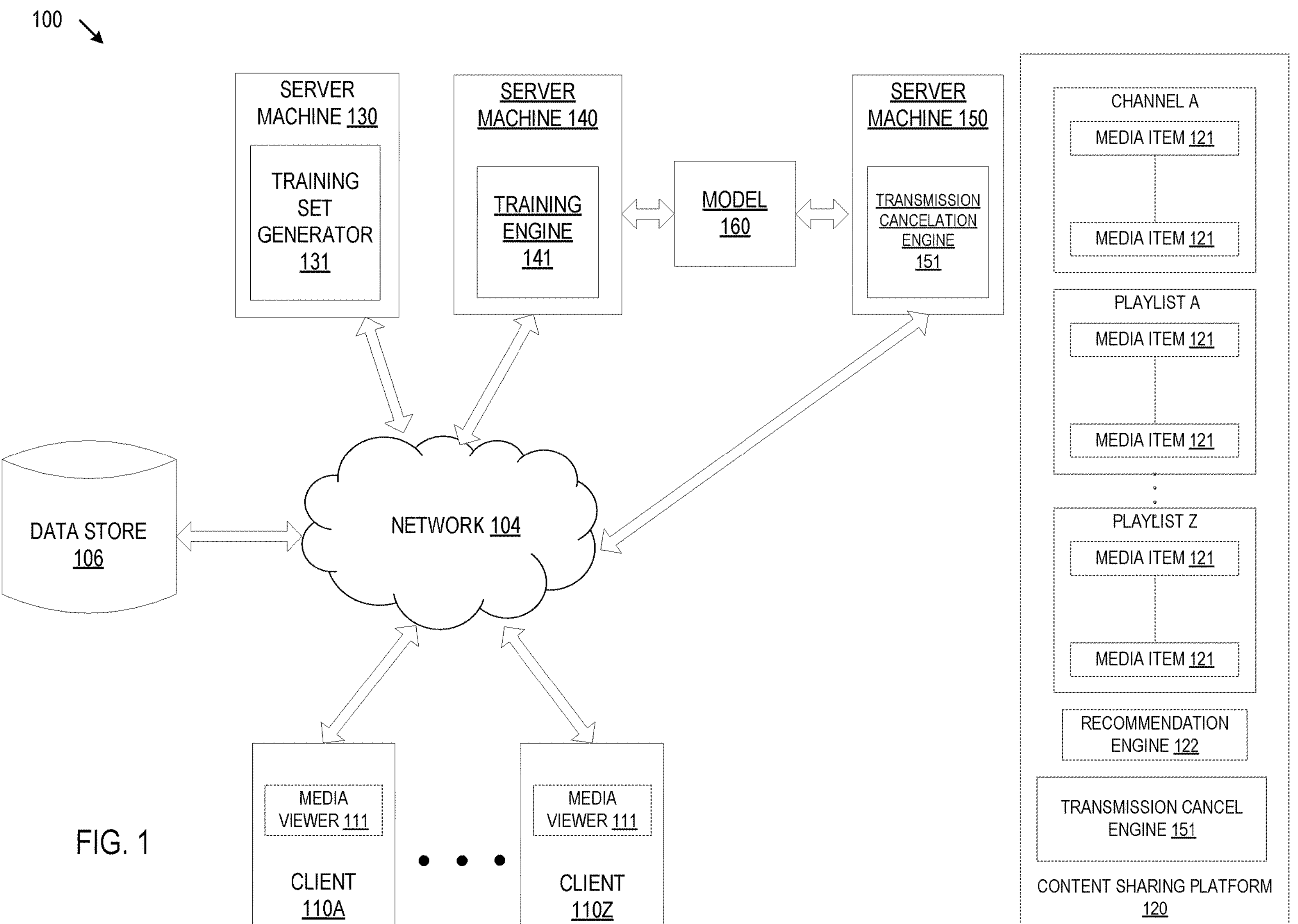
FIG. 1 illustrates an example system architecture, in accordance with one implementation of the disclosure.

A content delivery platform (e.g., content sharing platform 120) may serve media items, such as video items, audio items, or gaming items, to users via user devices. A user may log in to a user account associated with the content delivery platform to access the content delivery platform and consume the media items. The number of media items that a user account may concurrently access may be limited. For instance, for a particular user account the number of concurrently streamed media items may be limited to 3 concurrent streams. If the number of concurrently streamed media items for the user account exceeds the limit (e.g., the user starts a $4^{th}$ stream), a stream is canceled. In some systems, cancelation of a stream is determined using a last-in, first-out (LIFO) approach or a first-in, first-out (FIFO) approach, and without any regard to contextual information or a predicted preference of the user, for example. The outcome of FIFO and LIFO approaches often do not provide satisfactory results, may be disruptive to the user experience and may result in inefficient use of computer resources.

For example, a user might close a laptop that has a browser tab playing music, go to the user's car, begin playing music on the user's phone, and then ask the user's voice-activated digital assistant to play music as soon as the user enters the house. In each case, it takes time in order to conclude that the previous stream has become inactive. If the user account is limited to one-stream at a time, the use of conventional systems would result in generating an error message each time the user tries to start streaming on the next user device. In another example, a user might stream a live sporting event on the user's phone. As the user arrives home, the user may ask a digital assistant to cast the live sporting event on the TV, in order not to miss any portion of the live sporting event. The use of a conventional last-in-first-out (LIFO) approach would result in generating an error, with the digital assistant being unable to begin playback in the scenario of a one-stream limit. In still another example, a user who regularly watches a TV series on the user's smart TV might decide to download some episodes to the user's tablet for a plane ride. In the scenario of a one-download limit, the use of the LIFO approach would result in generating an error to notify the user that another device already has the episodes downloaded, and that the download of the episodes to the second device is not permitted.

Aspects of the disclosure address the above-mentioned and other challenges by training a machine learning model using training input data that includes contextual information associated with each of the user devices to which one or more media items are being transmitted, and target output data that indicates a preference of a user to either cancel or keep each of the transmissions. The user devices are associated with a particular user account. In implementations, once the machine learning model is trained, it may be used to determine which of the transmissions to the user devices should be canceled.

A transmission may refer to providing content, such as a media item, to a user device, and may represent a current process of transferring the content to the user device or a previously completed transfer of the content to the user device. For example, transmissions may include concurrent streaming of one or more media items to one or more user devices, current downloading of one or more media items to one or more user devices, previous downloading of one or more media items to one or more user devices, or any combination of the above. Canceling a transmission to a user device may refer to the termination of the capability to play a media item on the user device. For example, the transmission to a user device may be canceled by terminating transfer of a media item to the user device during the streaming process, thereby preventing the user from playing on the user device the media item that was requested to be streamed to the user device. In another example, the transmission to a user device may be canceled by terminating the transfer of a media item to the user device during the download process, thereby preventing the user from playing on the user device the media item that was requested to be downloaded to the user device. In still another example, the transmission to a user device may be canceled by terminating the capability to play on the user device a media item that has been previously downloaded to the user device.

Instead of using LIFO or FIFO approaches, aspects of the present disclosure train a machine learning model using contextual information organized per user device as training inputs, and user selections of transmissions to cancel and transmissions to keep as target outputs for the respective training inputs. For example, to train a machine learning model, a prompt may be displayed on each user device that is currently streaming a media item in response to the number of concurrent streams exceeding a threshold. The messages may be different on the user device that is newly starting a stream versus the user device that is being asked whether to continue a stream (e.g., "do you want to stop streaming on your [XPhone] so that you can play on this device instead?" versus "your XBook is playing content. Do you want to cut off {ShowX} on your XBook so you can start playing on this device?"). Once the machine learning model is trained, it can be used "live," making a prediction each time any concurrent stream limit is reached by a user account. The prediction may specify which stream the user is likely to cancel and which stream(s) the user is likely to keep, with a confidence score indicating the likelihood of matching the user preference. In some implementations, responsive to a low confidence score, user feedback may be requested by, for example, sending a message to each user device (e.g., "do you want to stop playing on your XPhone so you can play here instead?"). Responsive to a high confidence score, a stream associated with a particular user device may be canceled with or without requesting user feedback. The machine learning model can be similarly trained and then used "live" to resolve content downloads to user devices where the number of downloads exceeds the download limit for the user account.

Accordingly, aspects of the present disclosure provide a mechanism by which a transmission to be canceled due to an excessive number of transmissions for a user account is selected in accordance with a predicted user preference. This increases the reliability of content delivery systems, and reduces or eliminates the need for manual checking of the results of such techniques. In addition, conventional techniques that use LIFO or FIFO approaches may result in canceling a stream that is of a particular interest to a user, which may lead to additional operations (repeating the transmission of the stream being canceled after canceling another stream that is of less importance to the user). Thus, by selecting a stream to be canceled that matches a user preference, aspects of the present disclosure eliminate the need for the above additional operations, thereby resulting in more efficient use of computing (processing) resources and in improved user experience.

It may be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming.

"Concurrent streaming" or "concurrently streamed" or the like may refer to concurrent playback of one or more media items on one or more user devices. It may be noted playback may refer to a time period beginning when a media item is played by a media viewer and ends at some event, such as the user goes inactive for some time period, stops playback, pauses playback, or logs out, for example. "Concurrent streaming" or "concurrently streamed" may also refer concurrent open instances of application to stream media items where open may refer to a time period beginning when a user opens the application and ends at some event, such as the user goes inactive for some time period, stops playback, closes the application, or logs out, for example.

For instance, a family plan for a shared user account may allow up to 5 members and up to 3 concurrent streams. In this type of plan, 5 user profiles that are associated with a user account may be part of the family plan, but only 3 user devices at a time can concurrently stream one or more media items. In a first example, three user devices may have open different instances of an application to stream media items. Whether the three devices are actively streaming media items or not, the three devices count towards the plan limit for the user account. In a second example, four user devices have open four instances of the application to stream media items open but only three of the user devices have an active stream (e.g., performing playback of a media item). In the second example, only the user devices with active streams are counted towards the plan limit for the user account. It may be note that multiple user devices may include multiple physically separate user devices or multiple applications (e.g., browsers) on the same user device. For instance, two browsers on the same computer might appear to be two user devices because of cookie identification.

In some implementations, streaming may be an alternative to file downloading. "Downloading" or "download" as a verb may refer to a process in which the receiving device obtains the entire file of the content and stores the content, via non-volatile media for example, before playback. "Download" as a noun may refer to content, such as a media item, that is downloading or downloaded.

For purpose of illustration, rather than limitation, aspects of the disclosure describe the training of a machine learning model and use of a trained machine learning model to determine which stream from media items concurrently streamed to user devices for a user account is to be canceled. It may be noted that aspects of the disclosure may be implemented in a way other than a machine learning model. For instance, aspects of the disclosure may be implemented as a heuristic model or rule-based model to determine which stream from media items concurrently streamed to user devices for a user account is to be canceled, as further described below.

FIG. 1 illustrates an example system architecture 100, in accordance with one implementation of the disclosure. The system architecture 100 (also referred to as "system" herein) includes a content sharing platform 120 (also referred to a "content distribution platform" herein), one or more server machines 130 through 150, a data store 106, and client devices 110A-110Z connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In implementations, data store 106 is a persistent storage that is capable of storing content items (such as media items) as well as data structures to tag, organize, and index the content items. Data store 106 may be hosted by one or more storage devices, such as main memory, magnetic or optical storage based disks, tapes or hard drives, NAS, SAN, and so forth. In some implementations, data store 106 may be a network-attached file server, while in other embodiments data store 106 may be some other type of persistent storage such as an object-oriented database, a relational database, and so forth, that may be hosted by content sharing platform 120 or one or more different machines coupled to the server content sharing platform 120 via the network 104.

The client devices 110A-110Z may each include computing devices such as personal computers (PCs), laptops, mobile phones, smart phones, tablet computers, netbook computers, network-connected televisions, etc. In some implementations, client devices 110A through 110Z may also be referred to as "user devices." In implementations, each client device includes a media viewer 111. In one implementation, the media viewers 111 may be applications that allow users to playback, view, or upload content, such as images, video items, web pages, documents, audio items, etc. For example, the media viewer 111 may be a web browser that can access, retrieve, present, or navigate content (e.g., web pages such as Hyper Text Markup Language (HTML) pages, digital media items, etc.) served by a web server. The media viewer 111 may render, display, or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application, or native application) that allows users to playback digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A-110Z by content sharing platform 120. For example, the media viewers 111 may be embedded media players that are embedded in web pages provided by the content sharing platform 120. In another example, the media viewers 111 may be applications that are downloaded from content sharing platform 120.

In one implementation, the content sharing platform 120 or server machines 130-150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, the content sharing platform 120 may allow a user to consume, upload, search for, approve of ("like"), disapprove of ("dislike"), or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

For brevity and simplicity, rather than limitation, a video item, audio item, or gaming item are used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items or fingerprints as electronic files in one or more formats using data store 106.

In one implementation, the media items 121 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In implementations, content sharing platform 120 may allow users to create, share, view or use playlists containing media items (e.g., playlist A-Z, containing media items 121). A playlist refers to a collection of media items that are configured to play one after another in a particular order without any user interaction. In implementations, content sharing platform 120 may maintain the playlist on behalf of a user. In implementations, the playlist feature of the content sharing platform 120 allows users to group their favorite media items together in a single location for playback. In implementations, content sharing platform 120 may send a media item on a playlist to client device 110 for playback or display. For example, the media viewer 111 may be used to play the media items on a playlist in the order in which the media items are listed on the playlist. In another example, a user may transition between media items on a playlist. In still another example, a user may wait for the next media item on the playlist to play or may select a particular media item in the playlist for playback.

Server machine 130 includes a training set generator 131 that is capable of generating training data (e.g., a set of training inputs and a set of target outputs) to train a machine learning model. Some operations of training set generator 131 are described in detail below with respect to FIGS. 2-3.

Server machine 140 includes a training engine 141 that is capable of training a machine learning model 160 using the training data from training set generator 131. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model 160 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a back-propagation learning algorithm or the like. For convenience, the remainder of this disclosure will refer to the implementation as a neural network, even though some implementations might employ an SVM or other type of learning machine instead of, or in addition to, a neural network.

In one aspect, the training set is obtained from server machine 130. Server machine 150 includes a transmission cancelation engine 151 that provides current data (e.g., contextual information associated with multiple devices) as input to trained machine learning model 160 and runs trained machine learning model 160 on the input to obtain one or more outputs. As described in detail below with respect to FIG. 4, in one implementation transmission cancelation engine 151 is also capable of identifying transmissions (e.g., streams or downloads) of one or more media items to multiple user devices associated with a user account from the output of the trained machine learning model 160 and extract confidence data from the output that indicates a level of confidence for a preference of a user associated with the user account to cancel one of the transmissions of one or more of the multiple media items to the multiple user devices for the user account, and use the confidence data to decide to automatically cancel the above transmission (e.g., without user input to affirmatively cancel the transmission, or to provide a recommendation suggesting that a particular transmission should be canceled).

In an implementation, confidence data may include or indicate a level of confidence of a user preference to cancel or keep a transmission of a respective media item. In one example, the level of confidence is a real number between 0 and 1 inclusive, where 0 indicates no confidence a user prefers to cancel the streaming of a particular media item (e.g., absolute confidence a user prefers to keep the stream) and 1 indicates absolute confidence a user prefers to cancel the streaming of a particular media item (e.g., no confidence a user prefers to keep the stream).

As noted above, the number of transmissions may be limited for a user account. For example, a user account may be permitted to have no more than 4 concurrent streams. Responsive to the user launching a $5^{th}$ stream for the user account, content sharing platform 120 may determine that the number of concurrent streams to the user's devices for the user account exceeds the allowed number for the user account. Responsive to the determination, the trained machine learning model 160 may be provided contextual information for each of the user devices that are concurrently streaming the media items. For instance, contextual information associated with a first user device may be used as first input to the trained machine learning model 160, contextual information associated with a second user device may be used as second input, and so forth.

In implementations, the contextual information used as input to the trained machine learning model 160 may be information with respect to the current circumstances or context of the user access to the content sharing platform 120 using the particular user devices. The trained machine learning model 160 may produce an output that indicates the transmissions of the media items to the user devices, and a level of confidence for a preference of the user to cancel or keep each of the transmissions. Content sharing platform 120 may determine which transmission to cancel and which transmission(s) to keep based on the level of confidence. As noted above, the content sharing platform 120 may automatically cancel a transmission based on the level of confidence. In some implementations, a recommendation may be sent to the user device, suggesting a particular transmission that should be canceled.

In some implementations, content sharing platform 120 may implement a recommendation engine 122 to provide the recommendation(s). In implementations, the recommendation engine 122 may be a stand-alone application or part of transmission cancelation engine 151. In some implementations, a recommendation may be an indicator (e.g., interface component, electronic message, recommendation feed, prompt, etc.) that provides a user with personalized suggestions or selections that may appeal to a user. A recommendation may include, but is not limited to, a recommendation to cancel (or maintain) a particular stream (or download) from streams (or downloads) to multiple devices for user account.

In some implementations, training set generator 131 may generate training data to train a machine learning model using recommendations and a user selection in response to the recommendations. For example, responsive to determining that the number of concurrent streams to multiple user devices for the user account exceeds a threshold number of concurrent streams allowed for the user account, a prompt may be sent for display on one or more of the multiple user devices that are streaming one or more media items. The message of the prompt may be different for each user device. For example, the message to the user device that is newly starting a stream may be different from the message to the user device that is being asked whether to continue a stream. For example, the messages may include, "Do you want to stop streaming on your {XPhone} so that you can play on this device instead?," "Your XBook is playing content. Do you want to cut off {Movie Title} on your XBook so you can start playing on this device?" The user selection to cancel (or maintain) a particular stream on a particular device may be used as target output data to train the machine learning model.

Once the machine learning model is trained the trained machine learning model 160 can be used to provide an output identifying concurrent streams to the multiple user devices, and a level of confidence associated with each of the streams, where the level of confidence indicates a preference of the user to cancel a respective stream. In some implementations, responsive to a low level of confidence (e.g., the confidence score is below a threshold level of confidence), a prompt may be sent to one or more of the user devices (e.g., "Do you want to stop playing on your XPhone so you can play here instead?," "Your XPhone is trying to play a video—do you want to stop playing here so you can watch on your XPhone?"). In some implementations, responsive to a high level of confidence (e.g., if the confidence score exceeds or is equal to a threshold level of confidence), a default action can instead be taken (e.g., automatically canceling a stream or download without user input). In some implementations, the default action may be taken and the user may be given an opportunity to undo the default action. For example, the user may be prompted "We have stopped the music on your XPhone in order to start playing on your Xoogle Home [Undo]," "We have stopped playback here since playback started on your XPhone [Undo]."

In some implementations, the prompt may include an indication of which content or which type of content will be terminated, as well as which user profile is streaming the content. For example, "Do you want to stop Emily's playback of the Yankees game, so that you can play this song?"

In implementations, the user may access content sharing platform 120 through a user account. The user may access (e.g., log in to) the user account by providing user account information (e.g., username and password) via an application on client device 110 (e.g., media viewer 111). In some implementations, the user account may be associated with a single user. In some implementations, user activity associated with the user account may be recorded and used as input the train the machine learning model (e.g., training engine 141), or as input to the trained machine learning model 160. In other implementations, the user account may be a shared account (e.g., family account shared by multiple users) (also referred to as "shared user account" herein). The shared account may have multiple user profiles, each associated with a different user. The multiple users may login to the shared account using the same account information or different account information. In some implementations, the multiple users of the shared account may be differentiated based on the different user profiles of the shared account. In implementations, user activity associated with the different user profiles of a shared account may be recorded and used as input to train the machine learning model (e.g., training engine 141), or as input to the trained machine learning model 160.

In implementations, the number of transmissions of media items allowed for a particular user account may be a fixed number. It may be noted that number of transmissions allowed for a particular account may be a number of downloads, a number of streams, or a number of transmissions including downloads and streams, for example. In other implementations, the number of transmissions of media items allowed for a particular user account may be a variable number. For example, the number of concurrent streams allowed for a particular user account when the user devices are on the same LAN may be different from the number of concurrent streams allowed for a particular user account when the user devices are on different LANs.

In one implementation, for a particular user account, the number of media item downloads may be limited. The machine learning model may be trained using the training inputs 230 and target outputs 240 described herein (see FIG. 2). The trained machine learning model may then be used to determine which download from previous and/or current downloads to user devices for a user account is to be canceled. Canceling a download may be performed in several ways. For example, a current download of a media item may be terminated. If a media item's download to be canceled was completed in the past, content sharing platform 120 may send an invalidation signal to the respective user device that prevents playback of the media item whose download was completed in the past, for example.

Also as noted above, for purpose of illustration, rather than limitation, aspects of the disclosure describe the training of a machine learning model and use of a trained machine learning model using information pertaining to transmissions of one or more media items to a plurality of user devices associated with a user account to determine which of the transmission is to be canceled. In other implementations, a heuristic model or rule-based model to determine which stream (or download) from media items concurrently streamed (or downloaded) to user devices for a user account is to be canceled. In some implementations, content sharing platform 120 may determine or monitor contextual information (e.g., contextual information 230A described with respect to FIG. 2) on user devices. For example, a particular user account may be concurrently streaming 3 media items. Content sharing platform 120 may monitor for information such as contextual information (e.g., the user activity on each device, the current playback status on each device, etc.), session information, or visit information. It may be noted that any of the information described with respect to training inputs 230 of FIG. 2 may be monitored or otherwise used in the heuristic or rule-based model. Content sharing platform 120 may score each piece of information on a per device basis. The scores associated with the user devices may be compared across user devices, and the stream on the user device with the highest score may be canceled. In other implementations, the scores associated with the user devices may be compared to a threshold. If the score exceeds the threshold, the stream of the respective user device may be canceled.

It should be noted that in some other implementations, the functions of server machines 130, 140, and 150 or content sharing platform 120 may be provided by a fewer number of machines. For example, in some implementations server machines 130 and 140 may be integrated into a single machine, while in some other implementations server machines 130, 140, and 150 may be integrated into a single machine. In addition, in some implementations one or more of server machines 130, 140, and 150 may be integrated into the content sharing platform 120.

In general, functions described in one implementation as being performed by the content sharing platform 120, server machine 130, server machine 140, or server machine 150 can also be performed on the client devices 110A through 110Z in other implementations, if appropriate. In addition, the functionality attributed to a particular component can be performed by different or multiple components operating together. The content sharing platform 120, server machine 130, server machine 140, or server machine 150 can also be accessed as a service provided to other systems or devices through appropriate application programming interfaces, and thus is not limited to use in websites.

Although implementations of the disclosure are discussed in terms of content sharing platforms and promoting social network sharing of a content item on the content sharing platform, implementations may also be generally applied to any type of social network providing connections between users, or content delivery platform. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
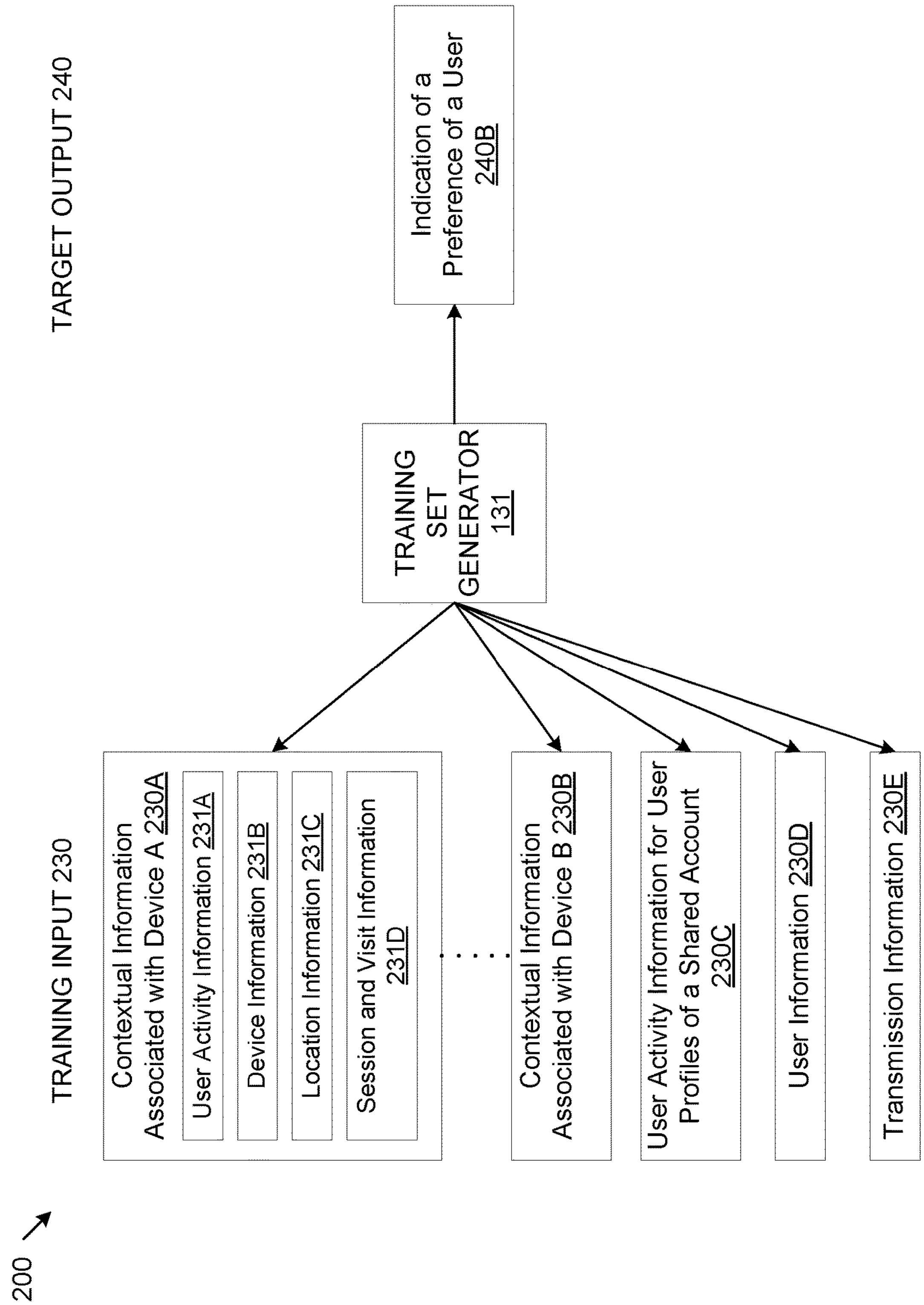
FIG. 2 is an example training set generator to create training data for a machine learning model using information pertaining to transmissions of media items to user devices associated with individual user accounts, in accordance with implementations of the disclosure.

FIG. 2 is an example training set generator to create training data for a machine learning model using information pertaining to transmissions of one or more media items to user devices associated with a user account, in accordance with implementations of the disclosure. System 200 shows training set generator 131, training inputs 230, and target outputs 240. System 200 may include similar components as system 100, as described with respect to FIG. 1. Components described with respect to system 100 of FIG. 1 may be used to help describe system 200 of FIG. 2.

In implementations, training set generator 131 generates training data that includes one or more training inputs 230, and one or more target outputs 240. The training data may also include mapping data that maps the training inputs 230 to the target outputs 240. Training inputs 230 may also be referred to as "features," "attributes," or "information." In some implementations, training set generator 131 may provide the training data in a training set, and provide the training set to the training engine 141 where the training set is used to train the machine learning model 160. Generating a training set may further be described with respect to FIG. 3.

In one implementation, training inputs 230 may include one or more of contextual information 230A associated with a particular user device (e.g., device A), additional contextual information 230B associated with another device user activity information 230C for user profiles of a shared account (hereinafter referred to as "user profile activity information 230C"), user information 230D, or transmission information 230E. It may be noted that contextual information, such as contextual information 230A, may be obtained for any number of devices associated with a user account (e.g., contextual information 230A-N). In some implementations, the contextual information 230A associated with a particular user device (hereinafter referred to as "contextual information") may be organized on a per device basis. In other implementations, the contextual information may include similar information organized on another basis.

In implementations, contextual information 230A may include categories 231 of contextual information that is also organized on a per device basis. Categories 231 of contextual information may include, but is not limited to, user activity information 231A with respect with user device A, device information 231B, location information 231C, and session and visit information 231D. Contextual information 230B may include similar categories 231 of contextual information as contextual information 230A. It may also be noted that contextual information and categories of contextual information may be included for any number of user devices associated with a user account. It may also be noted that one or more categories 231 of contextual information may be used as training inputs 230.

For the sake of illustration, rather than limitation, the training inputs 230 and target outputs 240 to train a machine learning model, include information for particular user accounts. Similarly, inputs to the trained machine learning model 160 may include information for particular user accounts to allow the trained machine learning model 160 to determine outcomes (e.g., whether to cancel a stream) for a specific user account or specific user profile of the user account. In other implementations, the information used to train the machine learning model may be from specific groups of user accounts having specific characteristics (e.g., user accounts with users from a particular geographic region) and allow the trained machine learning model 160 to determine outcomes for a specific group of user accounts based on input for a certain user account sharing characteristics of the specific group. In still other implementations, the information used to train the machine learning model may be for all user accounts and allow the trained machine learning model 160 to determine outcomes for all user accounts based on input for a specific user account.

In implementations, training inputs 230 may include contextual information 230A. Contextual information may refer to information regarding the circumstances or context of a user access to the content sharing platform 120 using a particular user device (e.g., user device A). For example, a user may access the content sharing platform 120 using a browser or native application by logging in to a user account. The user may use the browser or native application or both on a user device to stream or download media items from the content sharing platform 120. A record of contextual information with respect to the user access may be recorded and stored.

In implementations, contextual information 230A may include user activity information 231A. User activity information may refer to information describing the user interaction (e.g., activity or inactivity) (also referred to as "direct user activity information") with the content sharing platform 120 using a particular device or contextual information describing the context of the user interaction with the content sharing platform 120 using a particular device (also referred to as "contextual user activity information"). For example, direct user activity information may include user feedback, user browsing actions, user inputs (e.g., starting playback, pause, fast forward, rewind, replay, etc.), viewing history, and user inactivity with the website or native application (e.g., no user inputs), or timestamps for all of the aforementioned (e.g. start time of each stream or download, time of user inputs with respect to each stream). Contextual user activity may include information indicative of the context in which the user came to access the content sharing platform (e.g. a browser for accessing the website, a native application, through an intent icon, etc.), the time of day of the access, information about media content viewed, streamed, or downloaded (e.g., genre, length, title, artist, type such as video item, audio item, etc.), for example.

In some implementations, user activity information 231A may also include information on the context of the time period at or around the time the stream was terminated responsive to the number of concurrent streams exceeding the number allowed for the user account. The information may include identifiers of the media items that were streaming, and metadata associated with the media items (e.g., category or types). The information may also include metadata about the media item that was chosen to continue streaming. For example a system might learn that a live sports telecast tends to be continued when the user chooses between live sports vs. other types of concurrent streams like music.

In some implementations, user activity information 231A may also include information indicating usage patterns or habits with respect to consumption of media items and devices used to consume the media items. Information indicating usage patterns or habits may indicate a user's daily usage pattern. For example, information indicating usage patterns or habits may indicate that a user listens to music in their car while returning from office, and as soon as they reach home, the music is shifted from phone to home TV. In another example information indicating usage patterns or habits may indicate whether or not the user was prompted to choose a device to terminate playback on vs. whether a default was chosen, and if the user was prompted, which text was used in the prompt. Information indicating usage patterns or habits may be useful for avoiding biases that might crop up in which stream the user chose to terminate, based on what the system made easier as a default.

In implementations, contextual information 230A may include device information 231B. Device information may refer to any information with respect to a particular user device that accesses the content sharing platform 120. Device information 231B can allow content sharing platform 120 to distinguish between the different user devices that access content sharing platform 120. At a more granular level, device information 231B can distinguish between the type of user device (e.g., mobile phone, tablet, television, or desktop). In some implementations, device information 231B may include information regarding the one or more network connections of a user device. For example, user device information may include information (e.g., timestamps and network identifiers) regarding the different network connections or disconnections a user device makes throughout the day.

It may be noted that determining which user device a user is using to access content sharing platform 120 may be accomplished in many different ways. For example, if a user is using a browser the particular user device may be determined using a cookie, a user agent, or fingerprint information to identify the particular user device. If a native application is being used to access the content sharing platform 120, the native application may query the operating system of the user device and gather information to distinguish the particular user device.

In some implementations, contextual information 230A may include location information 231C. Location information may include geolocation information, proximity information, or contextual location information. Geolocation information may refer to information that allows for the identification or estimation of a real-world geographic location of the user device. For example, the geolocation information may be an address, a street, a city, a county, a state, etc. Geolocation information may be determined using a global positioning system (GPS) device, an internet protocol (IP) address, among others.

In implementations, proximity information may refer to information that allows for the identification or estimation that two or more user devices are in physical proximity to one another. An indication of physical proximity may include a local area network (LAN) identifier. Given the technical transmission limitations of different types of LAN, content sharing platform 120 may estimate that two device on the same LAN are within some distance (e.g., physical proximity) of one another. In another example, Bluetooth™, near-filed communication (NFC), or audio signals may be used to determine physical proximity. For example, a server may send a signal using a first user device, where the signal includes a token. The server may synchronize other user devices to receive the signal. The receipt of the signal by the other user devices may be confirmed by the server. Receipt of the token may imply physical proximity of the transmitting and receiving devices (e.g., based on similar technical transmission limitation of the signals). In implementations, contextual location information may refer to information the allows for the identification or estimation of a particular context or activity during which a user device is accessing content sharing platform 120. For example, contextual location information may identify that the user device is being used at work, home, the gym, in the car, while jogging, or at the airport, for example. In an example, to determine that the user device is being used in the car, GPS and speed or acceleration information may be used. In another example, to determine that the user device is being used at home, information describing the type of network connection and time data describing when the network connection is being accessed by a particular user device may be recorded (e.g., assuming a user accesses the network at home in the evening). It may be noted that different signals may be used in various different ways to estimate or determine the various contextual locations.

In some implementations, contextual information 230A may include session and visit information 231D. A session (or user session) may refer to a period of time that begins at the opening of an application (e.g., browser or native application) to access the content sharing platform 120 and ends at the closing of the application. Session information may be indicative of the period of session (e.g., start and end timestamps) and indicative of user activity with the application that accesses the content sharing platform 120 (e.g., to stream or download media items) during the session. The user activity information of a session may be similar to user activity information 231A as described above. It may be noted that a particular session may associated with a particular device. A particular device may have one or more active sessions. For example, the user device may be accessing the content sharing platform 120 using several tabs in a browser. A session may span for as long as the application is open, and even if the user is inactive.

In implementations, a visit may refer to a period of time that begins responsive to a user interaction (e.g., playback, cursor movement, etc.) with the application after a period of user inactivity during a session and ends after another period of user inactivity during the same session. It may be noted that two periods of user inactivity mentioned in the aforementioned may be the same length of time or different lengths of time. Visit information may be indicative of the period of visit (e.g., start and end timestamps) and indicative of user activity with the application that accesses the content sharing platform 120 (e.g., to stream or download media items) during the visit. It may be noted that a particular visit may associated with a particular session and a particular device.

In an example, a user may launch an application and stream a video item in the morning before going to work. Responsive to the launch of the application both a session and visit begin. When the user goes to work, the user may stop playback of the stream. The application may be open but is idle and receives no user input (e.g., user inactivity). After a period of user inactivity (e.g., that equals or exceeds a first threshold period of user inactivity), the first visit may end but since the application is still open the session continues. When the user comes home from work, the user may restart playback of the stream. The period of user inactivity begins from the time the user stops playback of the stream and ends when the user restarts playback of the stream. The period of user activity may be compared to a second threshold period of user inactivity. If the period of user inactivity exceeds the second threshold period of user inactivity, a second visit begins. The user may again pause playback of stream to eat dinner, and after a period of user inactivity, the second visit ends, and the session continues. Before going to bed the user may turn off the user device and close the application, which discontinues the session. In implementations, a session identifier (ID) may be associated with and identify a particular session. A visit ID may be associated with and identify a particular visit. Both the session ID and visit ID may be stored on the user device. Any time user activity is detected by with the application on the user device, the user device may send the session ID, visit ID, along with an action ID (identifying the user activity) to content sharing platform 120.

In some implementation, training inputs 230 may include user activity information for user profiles of a shared account (e.g., user profile activity information 230C). As noted above, a user account may be a shared account (e.g., family account shared by multiple users) having multiple user profiles. User activity information for a user profile may be similar to user activity information 231A, as described above, except the user activity information is associated with a specific user profile of the shared user account. In some implementations, the user activity information for a specific profile may still be organized on a per device basis. The user activity information for each of the different user profiles of shared user account may be used as training inputs 230.

In implementations, training inputs 230 may include user information 230D. User information may refer to information regarding types of users that access the content sharing platform 120. For example, user information 230D may include user affinities. An affinity may refer to user interest in a particular category (e.g., news, video games, college basketball, etc.) of media item. An affinity score (e.g. a value 0-1, low to high) may be assigned to each category to quantify user interest in a particular category. For example, a user may have an affinity score of 0.5 for college basketball and an affinity score of 0.9 for video gaming. For example, a user may be logged in (e.g., account name and password) to the content sharing platform 120, and the user information 230D may be associated with the user account. In another example, a cookie may be associated with a user, user device, or application, and the user information 230D may be determined from the cookie. In implementations, user information 230D may include the user information of some or all the users of a shared user account. In implementations, target inputs 230 may include the transmission information 230E indicative of the transmissions of the one or more media items to the user devices. For example, the transmission information 230E may identify the streamed media items that are concurrently streamed to the user devices for a user account. In another example, transmission information 230E may identify the downloaded media items that have been downloaded or have been selected for download for a user account.

In implementations, target outputs 240 may include an indication of a preference of a user 240B. In some implementations, an indication of a preference of a user may include a user selection to cancel or keep a particular transmission of one or more media items to multiple user devices for a user account. As described above, the user selection to cancel a particular transmission may be facilitated by recommendations. An indication of a preference of a user 240B may also include information identifying the particular device with which the canceled transmission (or kept transmission) is associated, information about the canceled or kept media item, information identifying the session and visit associated with each media item.

In some implementations, subsequent to generating a training set and training machine learning model 160 using the training set, the machine learning model 160 may be further trained (e.g., additional data for a training set) or adjusted (e.g., adjusting weights associated with input data of the machine learning model 160, such as connection weights in a neural network) using user selection to cancel a stream from multiple media items concurrently streamed to multiple user devices for a user account. For example, after a training set is generated and machine learning model 160 is trained using the training set, the training engine 141 may receiving an indication that the number of concurrent media item streams to the user devices for the user account exceeds the threshold number of concurrent streams allowed for the user account, and may use the machine learning model 160 to generate a test output that identifies a stream from the concurrent streams to the user devices for the user account that is to be canceled. The system 100 provides a recommendation to cancel the stream to a respective one of the user devices (and possibly different recommendation to the other user devices having streams that are not recommended for cancelation). The system 100 receives user selection to cancel a particular stream (e.g., the recommended stream or another stream) and uses this information to further train or adjust machine learning model 160.

Figure 3:
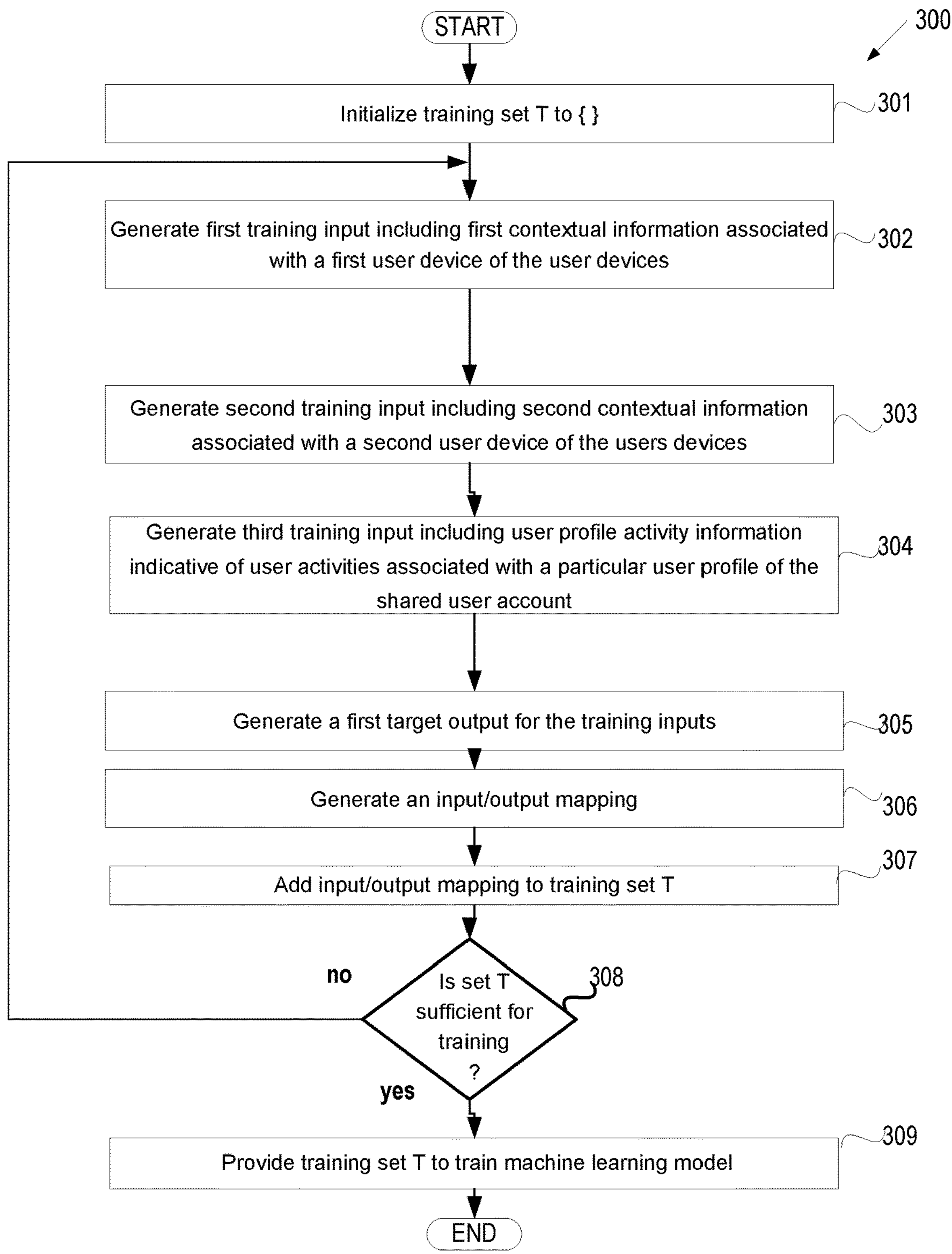
FIG. 3 depicts a flow diagram of one example of a method for training a machine learning model, in accordance with implementations of the disclosure.

FIG. 3 depicts a flow diagram of one example of a method 300 for training a machine learning model, in accordance with implementations of the disclosure. The method is performed by processing logic that may include hardware (circuitry, dedicated logic, etc.), software (e.g., instructions run on a processing device), or a combination thereof. In one implementation, some or all the operations of method 300 may be performed by one or more components of system 100 of FIG. 1. In other implementations, one or more operations of method 300 may be performed by training set generator 131 of server machine 130 as described with respect to FIGS. 1-2. It may be noted that components described with respect FIGS. 1-2 may be used to illustrate aspects of FIG. 3.

Method 300 generates training data for a machine learning model. In some implementations, at block 301 processing logic implementing method 300 initializes a training set T to an empty set.

At block 302, processing logic generates first training input that includes first contextual information 230A associated with a first user device of the user devices (as described with respect to FIG. 2). The user devices may be associated with a particular user account. It may be noted that one or more of the categories 231 of contextual information 230A may also be used as separate training inputs in some implementations.

At block 303, processing logic generates second training input including second contextual information 230B associated with a second user device of the users devices (as described with respect to FIG. 2). In some implementations, processing logic may generate the training inputs pertaining to the first and second user devices if the number of the media item transmissions to the user devices (including the first and second user devices) exceeds a threshold number of transmissions that is allowed for the user account. It may be noted that contextual information for any number of user devices may be used as training input.

At block 304, processing logic generates third training input that includes user profile activity information 230C indicative of user activities associated with a particular user profile of the shared user account.

At block 305, processing logic generates a first target output for one or more of the training inputs (e.g., training inputs one through three). The first target output provides an indication of a preference of a user associated with the user account to cancel a first transmission to the first user device responsive to the number of the transmissions to the plurality of user devices exceeding the threshold number, and an indication of a preference of the user to keep a second transmission to the second user device responsive to the number of the transmissions exceeding the threshold number.

At block 306, processing logic optionally generates mapping data that is indicative of an input/output mapping. The input/output mapping (or mapping data) may refer to the training input (e.g., one or more of the training inputs described herein), the target output for the training input (e.g., where the target output identifies an indication of a preference of a user to cancel respective transmissions), and an association between the training input(s) and the target output. At block 307, processing logic adds the mapping data generated at block 306 to training set T.

At block 308, processing logic branches based on whether training set T is sufficient for training machine learning model 160. If so, execution proceeds to block 309, otherwise, execution continues back at block 302. It should be noted that in some implementations, the sufficiency of training set T may be determined based simply on the number of input/output mappings in the training set, while in some other implementations, the sufficiency of training set T may be determined based on one or more other criteria (e.g., a measure of diversity of the training examples, accuracy, etc.) in addition to, or instead of, the number of input/output mappings.

At block 309, processing logic provides training set T to train machine learning model 160. In one implementation, training set T is provided to training engine 141 of server machine 140 to perform the training. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 309, machine learning model 160 can be trained using training engine 141 of server machine 140. The trained machine learning model 160 may be implemented by transmission cancelation engine 151 (of server machine 150 or content sharing platform 120) to determine which of the transmissions to user devices associated with a user account should be canceled.

Figure 4:
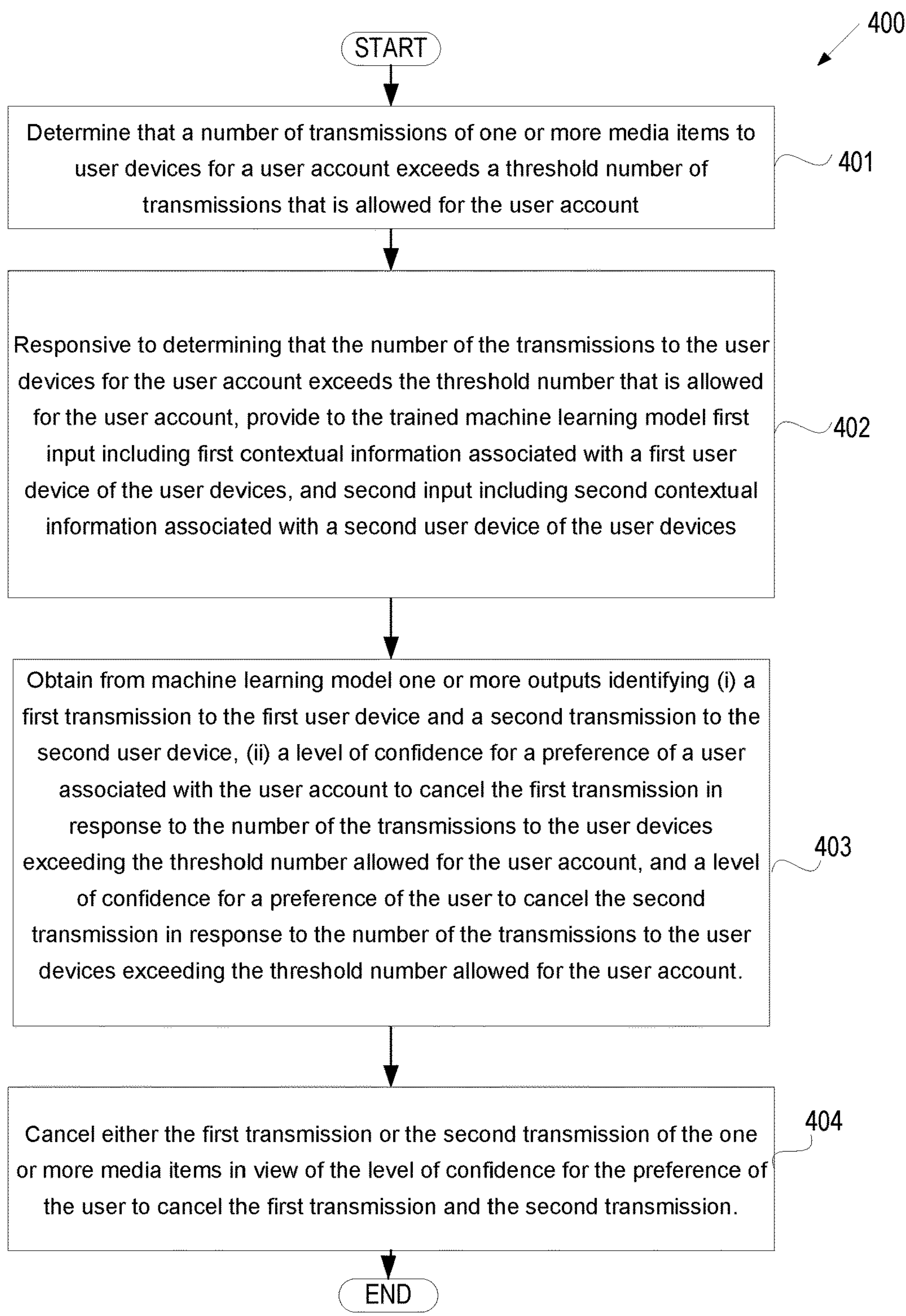
FIG. 4 depicts a flow diagram of one example of a method that uses information pertaining to transmissions of one or more media items to user devices associated with a user account to determine which of the transmissions is to be canceled, in accordance with implementations of the disclosure.

FIG. 4 depicts a flow diagram of one example of a method 400 for using the trained machine learning model with respect to transmissions of one or more media items to user devices associated with a user account to determine which of the transmissions is to be canceled, in accordance with implementations of the disclosure. The method is performed by processing logic that may include hardware (circuitry, dedicated logic, etc.), software (e.g., instructions run on a processing device), or a combination thereof. In one implementation, some or all the operations of method 400 may be performed by one or more components of system 100 of FIG. 1. In other implementations, one or more operations of method 400 may be performed by transmission cancelation engine 151 of server machine 150 or content sharing platform 120 implementing a trained model, such as trained machine learning model 160 as described with respect to FIGS. 1-3. It may be noted that components described with respect FIGS. 1-2 may be used to illustrate aspects of FIG. 4.

Method 400 may begin at block 401 where processing logic implementing method 400 determines that a number of transmissions of one or more media items to the user devices for the user account exceeds a threshold number of transmissions that is allowed for the user account. The transmitted media items may be different media items or multiple instances of the same media item.

At block 402, responsive to determining that the number of the transmissions to the plurality of user devices for the user account exceeds the threshold number that is allowed for the user account, processing logic provides, to a trained machine learning model 160, first input including first contextual information 230A associated with a first user device of the user devices and second input including second contextual information 230B associated with a second user device of the user devices.

In some implementations, processing logic may provide third input to the trained machine learning model 160. Third input may include user activity information indicative of user activity associated with one or more of the particular user profiles of the shared account.

At block 403, processing logic obtains, from the trained machine learning model 160 and based on the input data, one or more outputs identifying (i) a first transmission to the first user device and a second transmission to the second user device, and (ii) a level of confidence for a preference of a user associated with the user account to cancel the first transmission in response to the number of the transmissions to the plurality of user devices exceeding the threshold number allowed for the user account, and a level of confidence for a preference of the user to cancel the second transmission in response to the number of the transmissions to the plurality of user devices exceeding the threshold number allowed for the user account. At block 404, processing logic may cancel either the first transmission or the second transmission of the one or more media items in view of the level of confidence for the preference of the user to cancel the first transmission and the level of confidence for the preference of the user to cancel the second transmission. In some implementations, to cancel either the first transmission or the second transmission of the one or more media items, processing logic determines whether the level of confidence for the preference of the user to cancel either the first transmission or the second transmission exceeds a threshold level of confidence. Responsive to determining that the level of confidence for at least one of the first transmission or the second transmission exceeds the threshold level, processing logic cancels a respective transmission. In some implementations, processing logic may automatically cancel the respective transmission. Alternatively, processing logic may send a recommendation to cancel a respective transmission.

Figure 5:
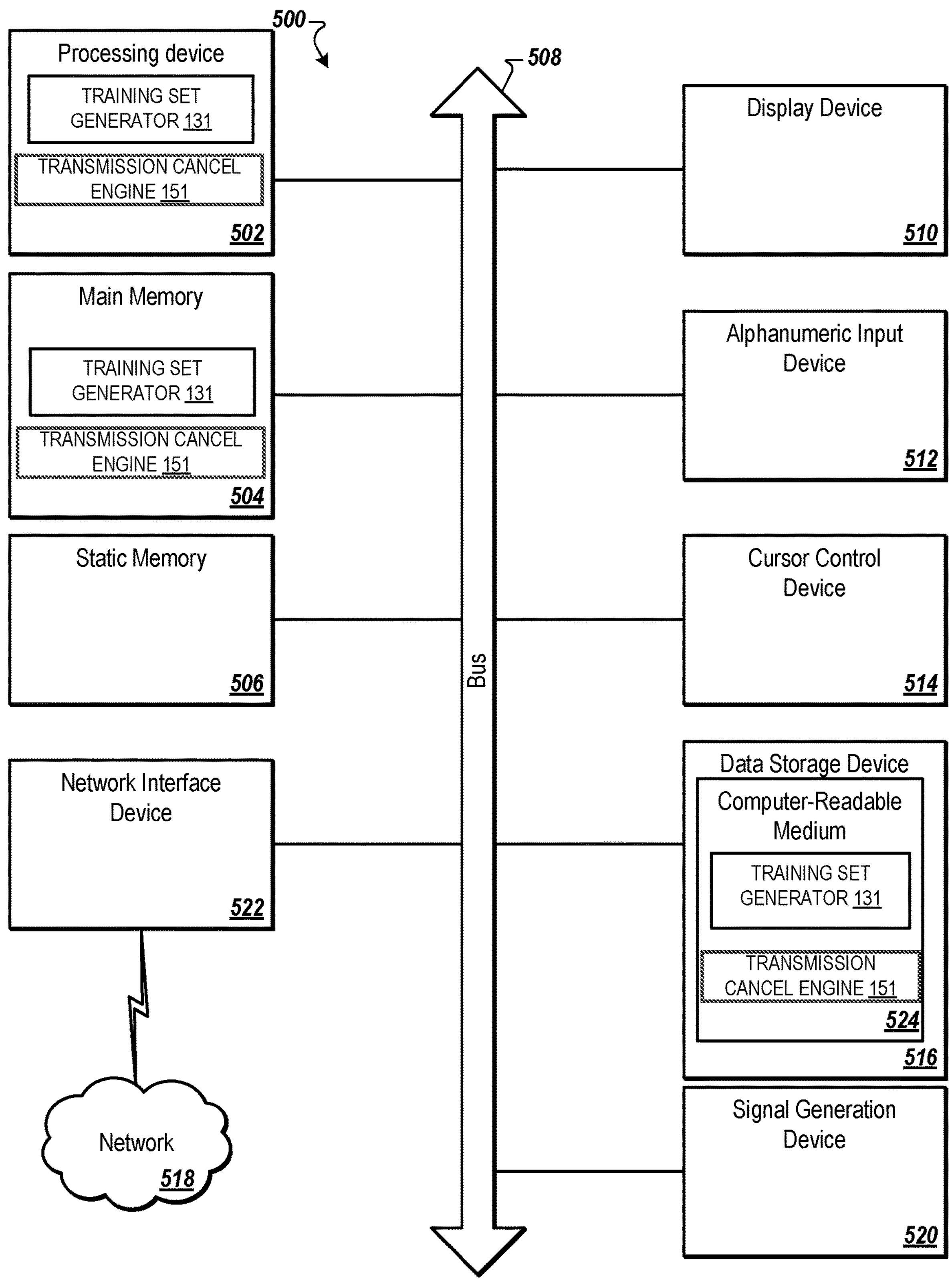
FIG. 5 is a block diagram illustrating an exemplary computer system, in accordance with an implementation of the disclosure.

FIG. 5 is a block diagram illustrating an exemplary computer system 500, in accordance with an implementation of the disclosure. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of training set generator 131 or transmission cancelation engine 151. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the training set generator 131 or transmission cancelation engine 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and of training set generator 131 or of transmission cancelation engine 151 embodying any one or more of the methodologies or functions described herein. The sets of instructions of the system architecture 100 and of training set generator 131 or of transmission cancelation engine 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method for training a machine learning model using information pertaining to transmissions of one or more media items to a plurality of user devices associated with a user account, the method comprising:

generating training data for the machine learning model, wherein generating the training data comprises:

generating first training input, the first training input comprising first contextual information associated with a first user device of the plurality of user devices; and generating a first target output for the first training input, wherein the first target output identifies an indication of a preference of a user associated with the user account to cancel a first transmission to the first user device responsive to a number of the transmissions to the plurality of user devices exceeding a threshold number; and providing the training data to train the machine learning model on (i) a set of training inputs comprising the first training input, and (ii) a set of target outputs comprising the first target output.

2. The method of claim 1, wherein generating the training data comprises:

generating second training input, the second training input comprising second contextual information associated with a second user device of the plurality of users devices, wherein the number of the transmissions to the plurality of user devices for the user account exceeds the threshold number, and wherein the set of training inputs comprises the second training input.

3. The method of claim 1, wherein the one or more media items are different instances of a same media item.

4. The method of claim 1, wherein the indication of the preference of the user associated with the user account to cancel the first transmission to the first user device represents a user selection to cancel the transmission associated with the first user device.

5. The method of claim 2, wherein the user account is a shared user account associated with a plurality of users, wherein generating the training data further comprises:

generating third training input, the third training input comprising user profile activity information indicative of user activities associated with a particular user profile of the shared user account; and wherein the set of training inputs comprises the first, the second, and the third training input.

6. The method of claim 1, wherein the first contextual information associated with the first user device comprises user activity information indicative of user interaction with an application of the first user device, wherein the application is to receive at least one of the one or more media items.

7. The method of claim 1, wherein the first contextual information associated with the first user device comprises device information indicative of a device type of the first user device.

8. The method of claim 1, wherein the first contextual information associated with the first user device comprises first location information indicative of a geolocation of the first user device.

9. The method of claim 1, wherein the first contextual information associated with the first user device comprises second location information indicative of a proximity of the first user device to other user devices associated with the user account.

10. The method of claim 1, wherein the first contextual information associated with the first user device comprises third location information indicative of a contextual location of the first user device.

11. The method of claim 1, wherein the first contextual information associated with the first user device comprises:

session information indicative of a user interaction with an application to receive at least one of the one or more media items during a session, wherein the session begins at an opening of the application and ends at a closing of the application, and visit information indicative of a user interaction with the application during a visit, wherein the visit begins responsive to a user interaction with the application after a first period of user inactivity during the session and ends after a second period of user inactivity during the session.

12. The method of claim 1, wherein each training input of the set of training inputs is mapped to the first target output in the set of target outputs.

13. The method of claim 2, further comprising:

receiving an indication that the number of the transmissions to the plurality of user devices exceeds the threshold number;

generating, by the machine learning model, a test output that identifies which of the transmissions of the one or more media items is to be canceled;

creating a recommendation to cancel at least one of the transmissions of the one or more media items to a respective one of the plurality of user devices;

receiving user input to cancel the transmission of the identified media item in view of the recommendation; and adjusting the machine learning model based on the user input.

14. The method of claim 1, wherein the transmissions of the one or more media items comprise concurrent streams of the one or more media items.

15. A method for using a trained machine learning model with respect to transmissions of one or more media items to a plurality of user devices associated with a user account to determine which of the transmissions is to be canceled, the method comprising:

determining that a number of the transmissions of the one or more media items to the plurality of user devices for the user account exceeds a threshold number of transmissions that are allowed for the user account;

responsive to determining that the number of the transmissions to the plurality of user devices for the user account exceeds the threshold number of transmissions that are allowed for the user account, providing to the trained machine learning model first input comprising first contextual information associated with a first user device of the plurality of user devices; and obtaining, from the trained machine learning model, one or more outputs identifying (i) a first transmission to the first user device, (ii) a level of confidence for a preference of a user associated with the user account to cancel the first transmission in response to the number of the transmissions to the plurality of user devices exceeding the threshold number of transmissions allowed for the user account.

16. The method of claim 15, further comprising:

providing second input comprising second contextual information associated with a second user device of the plurality of user devices; and obtaining, from the trained machine learning model, the one or more outputs identifying a second transmission to the second user device and a level of confidence for a preference of the user to cancel the second transmission.

17. The method of claim 16, further comprising:

canceling either the first transmission or the second transmission of the one or more media items in view of the level of confidence for the preference of the user to cancel the first transmission and the second transmission.

18. The method of claim 16, wherein the first transmission is a first stream of the one or more media items to the first user device and the second transmission is a second stream of the one or more media items to the second user device, wherein the first stream and the second stream are concurrent streams, and wherein the method comprises:

canceling either the first stream to the first user device or the second stream to the second user device in view of the level of confidence for the preference of the user to cancel the first stream and the second stream.

19. The method of claim 17, wherein canceling either the first transmission or the second transmission of the one or more media items comprises:

determining whether the level of confidence for the preference of the user to cancel either the first transmission or the second transmission exceeds a threshold level of confidence; and responsive to determining that the level of confidence for at least one of the first transmission or the second transmission exceeds the threshold level, canceling a respective transmission.

20. The method of claim 16, wherein the user account is a shared user account associated with a plurality of users, and wherein responsive to determining that the number of the transmissions to the plurality of user devices for the user account exceeds the threshold number of transmissions allowed for the user account, the method further comprising:

providing to the trained machine learning model third input comprising user activity information indicative of user activity associated with particular user profiles of the shared user account.

21. The method of claim 16, wherein the trained machine learning model was trained using a first training input comprising third contextual information associated with a third user device of a second plurality of user devices, a second training input comprising fourth contextual information associated with a fourth user device of the second plurality of users devices, and a target output for the first training input and the second training input, the target output comprising (i) an indication of a preference of a user associated with a second user account to cancel a third transmission to the third user device responsive to a number of transmissions to the second plurality of user devices exceeding a threshold number of transmissions allowed for the second user account, and (ii) an indication of a preference of the user to keep a fourth transmission to the fourth user device responsive to the number of the transmissions to the second plurality of user devices exceeding the threshold number of transmissions allowed for the second user account.

22. A system for using a trained machine learning model with respect to transmissions of one or more media items to a plurality of user devices associated with a user account to determine which of the transmissions is to be canceled, the system comprising:

a memory; and a processing device, coupled to the memory, to:

determine that a number of the transmissions of the one or more media items to the plurality of user devices for the user account exceeds a threshold number of transmissions that are allowed for the user account;

responsive to determining that the number of the transmissions to the plurality of user devices for the user account exceeds the threshold number of transmissions that are allowed for the user account, provide to the trained machine learning model first input comprising first contextual information associated with a first user device of the plurality of user devices; and obtain, from the trained machine learning model, one or more outputs identifying (i) a first transmission to the first user device, (ii) a level of confidence for a preference of a user associated with the user account to cancel the first transmission in response to the number of the transmissions to the plurality of user devices exceeding the threshold number of transmissions allowed for the user account.

23. The system of claim 22, the processing device further to:

cancel the first transmission of the one or more media items in view of the level of confidence for the preference of the user to cancel the first transmission.

24. A system for training a machine learning model using information pertaining to transmissions of one or more media items to a plurality of user devices associated with a user account, the system comprising:

a memory; and a processing device, coupled to the memory, to:

generate training data for the machine learning model, wherein to generate the training data the processing device to:

generate first training input, the first training input comprising first contextual information associated with a first user device of the plurality of user devices; and generate a first target output for the first training input, wherein the first target output identifies an indication of a preference of a user associated with the user account to cancel a first transmission to the first user device responsive to a number of the transmissions to the plurality of user devices exceeding a threshold number; and provide the training data to train the machine learning model on (i) a set of training inputs comprising the first training input, and (ii) a set of target outputs comprising the first target output.

25. The system of claim 24, wherein the one or more media items are different instances of a same media item.

* * * * *